United States Patent [19]

Wu

[11] Patent Number: 4,483,888
[45] Date of Patent: Nov. 20, 1984

[54] CARBON DIOXIDE TREATMENT OF EPOXY RESIN COMPOSITIONS

[75] Inventor: Yulin Wu, Bartlesville, Okla.

[73] Assignee: Phillips Petroleum Company, Bartlesville, Okla.

[21] Appl. No.: 495,294

[22] Filed: May 16, 1983

Related U.S. Application Data

[63] Continuation of Ser. No. 298,418, Sep. 1, 1981, abandoned.

[51] Int. Cl.$^3$ .................. C08J 3/00; C08L 63/00; B05D 3/00; B05D 3/04
[52] U.S. Cl. .................. 427/336; 427/386; 427/388.2; 427/388.5; 523/400; 523/463; 528/483
[58] Field of Search .......... 427/386, 388.2, 388.5, 427/336; 528/483; 523/400, 463

[56] References Cited

U.S. PATENT DOCUMENTS

| | | | |
|---|---|---|---|
| 2,756,211 | 0/1956 | Jones | 252/8.55 |
| 2,880,194 | 0/1959 | Glaser | 260/47 |
| 3,294,168 | 0/1966 | Bezemer | 166/33 |
| 3,355,315 | 0/1967 | Jorda | 117/97 |
| 3,368,626 | 0/1966 | Bezemer | 166/33 |
| 3,423,345 | 1/1969 | Hsu | 260/18 |
| 3,694,407 | 9/1972 | Krikorian | 260/33.6 EP |
| 3,772,228 | 11/1973 | Allen | 260/33.6 EP |
| 3,794,609 | 2/1974 | Menc | 260/33.6 EP |
| 3,867,346 | 2/1975 | Vargiu | 260/33.6 EP |
| 3,900,424 | 8/1975 | Inoue et al. | 528/405 |
| 3,960,801 | 6/1976 | Cole | 260/33.6 EP |
| 4,108,824 | 8/1978 | Dante | 260/33.4 EP |
| 4,143,000 | 0/1979 | Doss | 528/123 |
| 4,160,178 | 7/1979 | Smith et al. | 427/386 |
| 4,168,257 | 9/1979 | Meijs | 260/33.6 EP |
| 4,366,185 | 12/1982 | Tanaka et al. | 428/418 |
| 4,391,855 | 7/1983 | Geeck | 427/388.2 |

FOREIGN PATENT DOCUMENTS

| | | |
|---|---|---|
| 576340 | 3/1946 | United Kingdom . |
| 917090 | 1/1963 | United Kingdom . |
| 1054555 | 1/1967 | United Kingdom . |
| 1127556 | 9/1968 | United Kingdom . |
| 1437893 | 6/1976 | United Kingdom . |
| 1520969 | 8/1978 | United Kingdom . |

OTHER PUBLICATIONS

Journal of Coatings Technology, May 1980, pp. 65–69.
Chem. Abst., vol. 93, (1980), 93-221964q, Croll.
Pipes and Pipelines International, Jun. 1980, pp. 18 and 39.

*Primary Examiner*—Herbert J. Lilling
*Attorney, Agent, or Firm*—French and Doescher

[57] ABSTRACT

An epoxy resin composition is provided which contains carbon dioxide as a cure retardant. The composition comprises an epoxy resin, a curing agent for the epoxy resin, a hydrocarbon diluent and carbon dioxide. It can optionally contain an alcohol. The presence of the carbon dioxide enables preparation of an epoxy resin and curing agent solution which can be stored and transported to the site of application without curing of the resin until after application. The composition is useful, for example, as a corrosion inhibitor for metal surfaces, and is particularly useful for downhole metal equipment at oil and gas drilling sites.

17 Claims, 1 Drawing Figure

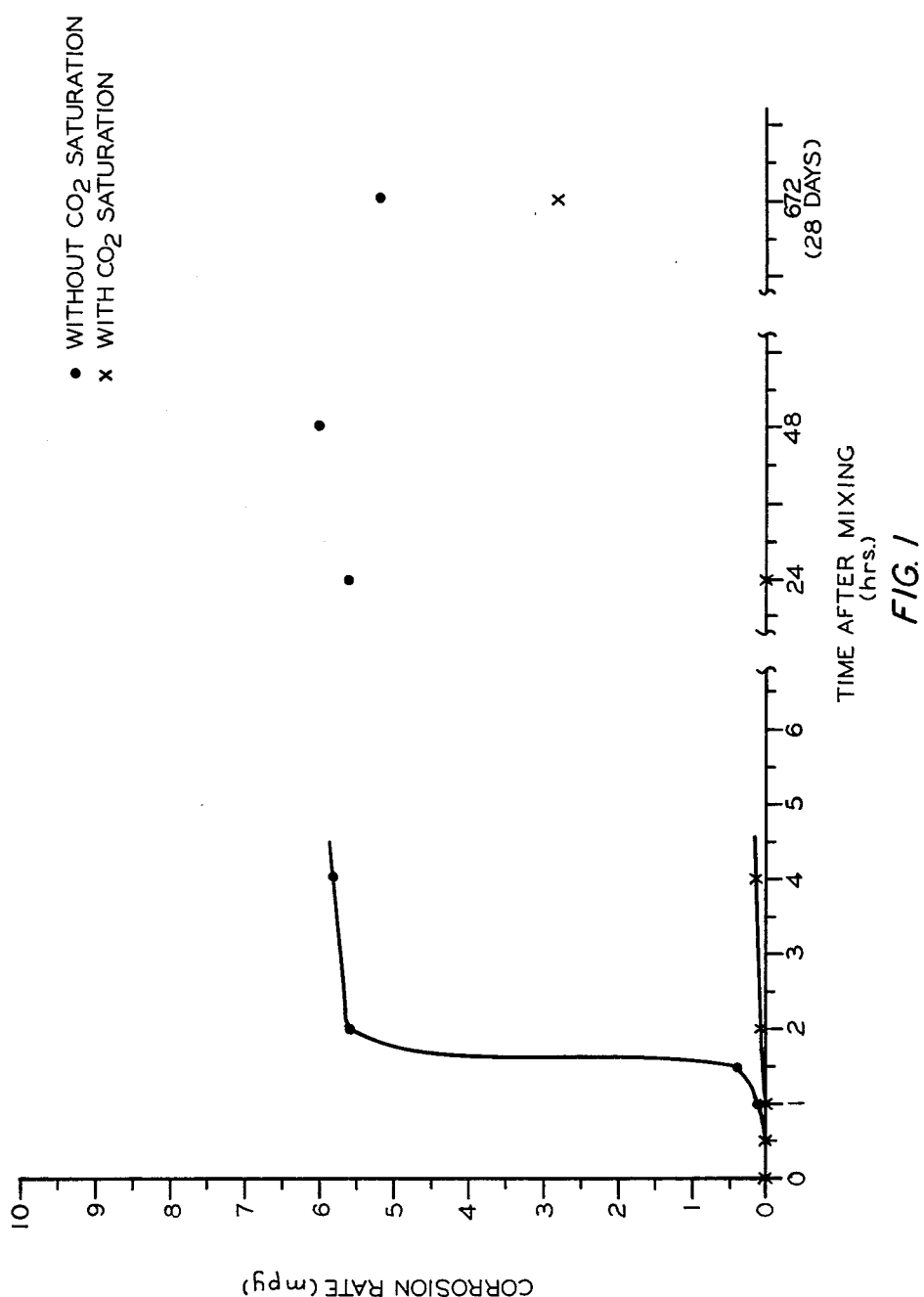

CARBON DIOXIDE TREATMENT OF EPOXY RESIN COMPOSITIONS

This is a continuation of application Ser. No. 298,418, filed Sept. 1, 1981 and now abandoned.

BACKGROUND OF THE INVENTION

This invention relates to epoxy resin compositions. It further relates to the curing of epoxy resins. In another aspect, it relates to cure retardation of epoxy resin composition for use as film-forming corrosion inhibitors.

Epoxy resins are useful materials for applications requiring a fluid substance which can harden into a tough coating or mass after application. Epoxy resins are used for such purposes as paint bases, corrosion-resistant coatings for metal surfaces, and sand consolidation compositions.

The mechanism by which a fluid epoxy resin solution hardens into a tough substance involves a chemical reaction between the epoxy resin and a curing agent such as an amine. Tht curing agent is mixed with the epoxy resin prior to application of the resin for its intended use and the curing reaction proceeds over a period of time which varies depending upon the individual resin and curing agent.

For certain commonly-used types of epoxy resin/curing agent formulations, the cure rate of the resin is so rapid that premixing and transportation of the total formulation to the desired location is not possible. This requires that mixing of the epoxy resin and the curing agent take place at the site of application, and thus increases the time and expense of application of epoxy formulation. The burden of mixing the components of the composition is particularly great if the site for application is remote from the sources of the chemicals or presents particular difficulties of transportation and physical mixing of the chemicals. Such difficulties are encountered for example, in preparing epoxy resin compositions for application to downhole metal surfaces in oil and gas wells for protection of the metal surfaces against corrosion. The oil and gas wells are often in locations remote from the source of the chemicals. The most serious problems are posed by offshore oil wells, in which preparation and application of such a corrosion-inhibiting formulation must take place under very severe environmental conditions and limitations of space, personnel and equipment. Transportation of the separate chemicals and of equipment for mixing them on site must be arranged, and additional personnel must be assigned and trained. The expense of using cured epoxy resin compositions could thus be reduced if the epoxy resin and the curing agent could be premixed amd transported to the site without significantly reducing the effectiveness of the composition for its intended purpose.

It is therefore an object of the invention to provide a curing composition for an epoxy resin.

It is a further object to provide a method for retarding the cure of an epoxy resin composition.

SUMMARY OF THE INVENTION

According to the invention, there is provided a method of retarding the cure of an epoxy resin. In the method, the epoxy resin/curing agent composition is contacted with carbon dioxide. The carbon dioxide can be a constituent of a curing agent solution or of an epoxy solution prior to mixing of the two solutions to prepare the epoxy resin/curing agent composition, or the carbon dioxide can be added to the prepared composition. The carbon dioxide can be added to and maintained in the composition in the form of a gas under pressure. The carbon dioxide-containing epoxy composition can be stored or transported to the site of application and applied in the usual manner. The utility of the epoxy composition, for example, as a corrosion-inhibiting formulation, is not adversely effected by the carbon dioxide treatment.

BRIEF DESCRIPTION OF THE DRAWING

The FIGURE illustrates the corrosion inhibiting effectiveness of the premixed epoxy/amine compositions prepared in Example II. The presence of carbon dioxide in the premixed composition significantly increases its shelf life.

DETAILED DESCRIPTION OF THE INVENTION

In the method of the invention, an epoxy resin composition containing carbon dioxide is prepared. The carbon dioxide can be added as a component of any constituent of the epoxy resin conposition prior to the preparation of the composition, or the carbon dioxide can be added to the prepared epoxy resin composition following mixing of the epoxy resin and curing agent.

Preferably, the curing agent is treated with carbon dioxide prior to the preparation of the epoxy resin/curing agent composition. In this method, the carbon dioxide as a gas is added to an anhydrous solution of the curing agent, and the resulting $CO_2$-containing curing solution is then mixed with a solution of the epoxy resin.

The addition of carbon dioxide gas to the epoxy composition or to a constituent of it can be carried out over a range of treatment pressures from zero psig to 6000 psig but is preferably about 0.5 to about 100 psig $CO_2$. The temperature at which $CO_2$ treatment can be carried out can vary widely but will generally be in the range of 0° C. to 100° C. Ambient laboratory temperatures have been found to be suitable, but colder and warmer temperatures encountered at well sites or other application locations are acceptable.

The pressure of the $CO_2$ treatment can be any pressure effective for adding gaseous $CO_2$ to a solution of the epoxy resin or curing agent. At room temperature in appropriate pressure equipment, the pressure of the gaseous $Co_2$ would generally be within the range of about zero psig to about 6000 psig, preferably 0.5 to 100 psig.

The epoxy compositions of the invention include an amount of carbon dioxide which is effective for retarding curing of the epoxy resin. When used in a composition containing an amine curing agent, the molar ratio of carbon dioxide to amine generally ranges from about 100:1 to about 1:100, preferably about 10:1 to 1:10, most preferably about 2:1 to about 1:2.

The invention method is applicable to any curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group containing compound is bisphenol A are represented below by structure I wherein n is zero or a number greater than 0, commonly in the range of 0 to 10, preferably in the range of 0 to 2.

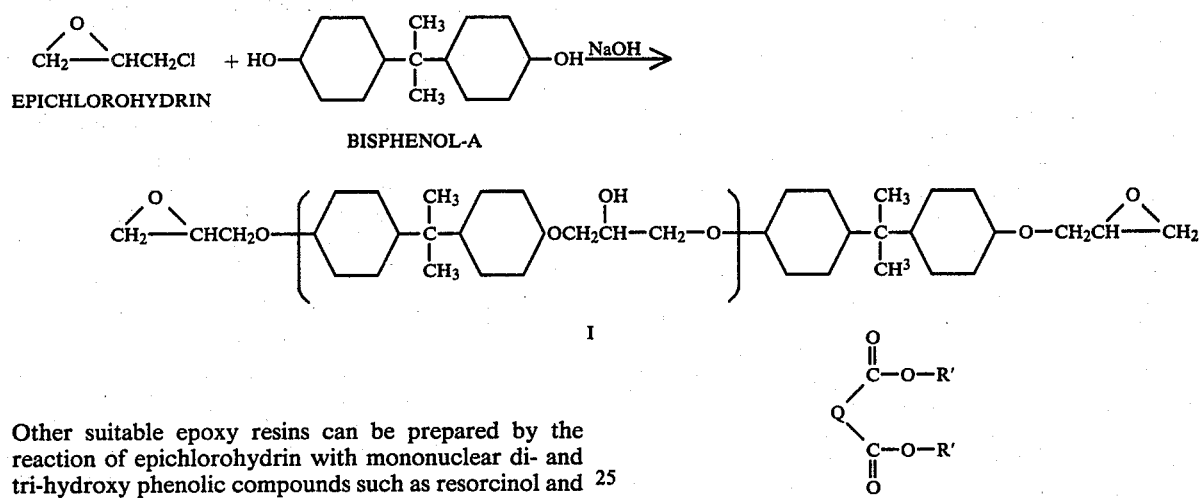

Other suitable epoxy resins can be prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol.

Epoxy resins suitable for use in the invention have molecular weights generally within the range of 50 to about 10,000, preferably about 200 to about 1500. The commercially available Epon ® 828 epoxy resin, a reaction product of epichlorohydrin and 2,2-bis(4-hydroxyphenyl)propane (bisphenol A) and having a molecular weight of about 400, an epoxide equivalent (ASTM D-1652) of about 185–192, and an n value in structure I above of about 0.2, is presently preferred because of the superior effectiveness, as shown in field tests, of a composition containing Epon ® 828.

Additional epoxy-containing materials suitable for use in the present invention include the epoxidized derivatives of natural oils such as the triesters of gylcerol with mixed long-chain saturated and unsaturated acids which contain, e.g., 16, 18 and 20 carbon atoms. Such natural oils are represented by formula II:

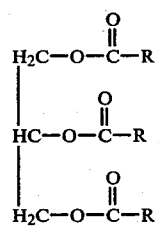

Wherein R represents alkyl and/or alkenyl groups containing 15 to 19 carbon atoms with the proviso that epoxidation of said oils yields a polyepoxide having more than one vicinal-epoxy group per molecule of epoxidized oil. Soybean oil is a typical triglyceride which can be converted to a polyepoxide suitable for use in the instant invention.

Other polyepoxides suitable for use in the present invention are derived from esters of polycarboxylic acids such as maleic acid, terephthalic acid, oxalic acid, succinic acid, azelaic acid, malonic acid, tartaric acid, adipic acid and the like with unsaturated alcohols as described by formula III:

wherein Q represents a valence bond, or the following groupings: 1,2-phenylene, 1,4-phenylene, methylene, dimethylene, heptamethylene, vinylene, 1.2-cyclohexylene, 1,4-cyclohexylene 1,2-ethylenediol and the like, and R' represents alkylene and branched alkylene groups containing 4 to 14 carbon atoms. Representative epoxidized esters derived from materials described by structure (III) include the following: di(2,3-epoxybutyl) tetrahydrophthalate, di(2,3-epoxyoctyl) oxalate, di(2,3-epoxyisobutyl) adipate, di(3,4-epoxypentyl) succinate, di(4,5-epoxydodecyl) terephthalate, di(3,4-epoxyhexyl) phthalate, di(2,3-epoxybutyl) tartrate, di(7,8-epoxytetradecyl) adipate, di(e,4-epoxybutyl) glutarate, di(2,3-epoxyhexyl) pimelate, di(3,4-epoxyoctyl) suberate, di(4,5-epoxydecyl) azelate, di(2,3-eopxyisohexyl) tetrahydroterephthalate and the like.

In addition to the foregoing, it is contemplated that suitable polyepoxides can be derived from esters prepared from unsaturated alcohols and unsaturated carboxylic acids described by formula IV:

$$R''O-\overset{O}{\underset{\|}{C}}-R'''$$

wherein R'' represents alkenyl and cycloalkenyl groups containing 4 to 12 carbon atoms and R''' represents alkenyl and cycloalkenyl groups containing 4 to 12 carbon atoms. Representative epoxidized esters include the following: 2,3-epoxypentyl 3,4-epoxybutyrate; 2,3-epoxybutyl 3,4-epoxyhexanoate; 3,4-epoxyoctyl 2,3-epoxycyclohexane carboxylate; 2,3-epoxydodecyl 4,5-epoxyoctanoate; 2,3-epoxyisobutyl 4,5-epoxydodecanoate; 2,3-epoxycyclododecyl 3,4-epoxypentanoate; 3,4-epoxyoctyl 2,3-epoxycyclododecane carboxylate and the like.

Other unsaturated materials which can be epoxidized to give resins suitable for use in the instant process include butadiene based polymers such as butadiene-styrene copolymers, polyesters available as derivatives of polyols such as ethylene glycol with unsaturated acid anhydrides such as maleic anhydride, and esters of unsaturated polycarboxylic acids. Representative polyepoxides derived from the latter include the following: dimethyl 3,4,7,8-diepoxydecanedioate; butyl 3,4,5,6-diepoxycyclohexan-1,2-carboxylate; dioctyl 3,4,7,8-diepoxyhexadecanedioate; diethyl 5,6,9,10-diepoxytetradecanedioate and the like.

Dimers of dienes such as 4-vinylcyclohexene-1 from butadiene and dicylopetadiene from cyclopentadiene can be converted to epoxidized derivatives which are suitable for use in the instant process.

Any agent suitable for curing epoxy resins may be used in the invention composition and method. Curing agents for epoxy resins include amines, acids, anhydrides and aldehyde resins. The curing agent is used in an amount effective for curing the amount of epoxy resin used.

Curing agents suitable for use in the invention composition and process include compounds having amino hydrogen atoms. These include aliphatic, cycloalipathic, aromatic and heterocyclic amines. Examples of curing compounds include aliphatic polyamines such as ethylene diamine, diethylene triamine, triethylene tetramine, tetraethylene pentamine, 1,4-aminobutane, 1,3-diaminobutane, hexamethylene diamine, 3-(n-isopropylamino)propylamine, N,N'-diethyl-1,3-propanediamine, hexapropylene heptamine, penta(1-methyl propylene)hexamine, tetrabutylenepentamine, hexa-(1,1-dimethylethylene)-heptamine, di(1-methylbutylene)triamine, pentaamylene hexamine, tri(1,2-trimethylethylene tetramine, tetra(1,3-dimethylpropylene pentamine, penta(1,5-dimethylamylene)hexamine, 5-methylnonanediamine, penta(1,2-dimethyl-1-isopropylethylene)hexamine and N,N'-dibutyl-1,6-hexanediamine.

A class of polyamines particularly suitable for use in the invention are N-alkyl- and N-alkenyl-substituted 1,3-diaminopropanes and mixtures thereof. Examples of such polyamines include N-hexadecyl-1,3-diaminopropane, N-tetradecyl-1,3-diaminopropane, N-octadecyl-1,3-diaminopropane, N-pentadecyl1,3-diamonopropane, N-heptadecyl-1,3-diaminopropane, N-nonadecyl-1,3-diaminopropane, and N-octadecenyl-1,3-diaminopropane. Various commercially available mixtures of N-alkylated and N-alkenylated diamines can be used in the invention. The presently preferred polyamine is a commercial product sold under the trademark Duomeen® T. This product is N-tallow-1,3-diaminopropane in which the majority of the tallow substituent groups are alkyl and alkenyl containing from 16 to 18 carbon atoms each, with a minority of substituent groups having 14 carbon atoms each. It is presently believed that the effectiveness of Duomeen® T in the corrosion-inhibiting composition stems from its relatively high molecular weight, which produces a long-chain "net" to cover the metal surface, its polyfunctionality, and its relatively high boiling point, which permits its use in high-temperature environments. Other commercially available materials include N-coco-1,3-diaminopropane in which the majority of the coco substituent groups contain 12 to 14 carbon atoms, commercially available under the trademane Duomeen® C, and N-soya-1,3-diaminopropane, which contains $C_{18}$ alkenyl groups along with a minor proportion of $C_{16}$ alkyl groups.

Additional polyamines suitable for use in the invention can contain 3 or more nitrogen atoms as illustrated by the following examples: N-dodecyl-diethylene triamine, N-tetradecyl-diethylene triamine, N-tetradecyl-dipropylene triamine, N-tetradecyl triethylene tetramine and the corresponding N-alkenyl triamines.

Other curing agents which can be used include polyfunctional nitrogen-containing compounds such as, for example, amino acids, amino alcohols, amino nitriles, and amino ketones; sulfonic acids; carboxylic acids; and organic anhydrides.

Alcohols suitable for use as optional components of the invention system include alkanols containing at least one —OH functional group. These include alcohols containing 1 to about 15 carbon atoms such as methanol, ethanol, 1-propanol, 2-propanol, butanols, pentanols, hexanols, heptanols, octanols, 1-pentadecanol, and mixtures of these. Polyols containing 2 to 5 carbon atoms such as ethylene glycol, 1,3-propanediol, 2,3-butanediol, glycerol and pentaerythritol can also be use. Presently, methanol is preferred, particularly in an epoxy composition containing xylene as the aromatic hydrocarbon diluent, Epon® 828 as the epoxy resin, and Duomeen® T as the polyamine, because Duomeen® T is soluble in methanol at room temperature and because of the effectiveness of the resulting $CO_2$-treated corrosion inhibiting system. When present in the composition, alcohol constitutes about 1 to about 99, preferably about 10 to about 60, most preferably about 20 to about 40 weight precent of the weight of the composition.

A hydrocarbon diluent can be used for the epoxy resin compositions. Examples of hydrocarbon diluents suitable for use in such compositions include the isomeric xylenes, toluene, benzene, naphtha, cyclohexylbenzene, fuel oil, diesel oil, heavy aromatic oils, Stoddart solvent, crude oil, and condensate from gas wells. Presently, xylene is the preferred hydrocarbon diluent because it is an effective solvent for the other preferred components and because of the corrosion-inhibiting effectivesness of the resulting $CO_2$-treated composition.

The higher-boiling aromatic hydrocarbons are particularly useful for epoxy resin compositions for application in deeper wells with higher downhole temperatures and in high-temperature gas and oil wells generally.

The components of the cure-retarded epoxy compositions can be mixed in any order but it is presently preferred to carry out the carbon dioxide treatment on a first solution of the curing agent prior to mixing with a second solution of the epoxy resin. For example, a representative curing agent solution contains xylene diluent, methanol and Duomeen® T (an N-alkyl-1,3-propanediamine) in about a 1:1:1 (mL:mL:g) ratio. A representative epoxy solution contains an epoxy resin such as Epon® 828 and xylene diluent with a resin:xylene ratio of 3:1 (g:mL). The cure-retarded epoxy composition is prepared by first bubbling carbon dioxide gas through the curing agent solution at about 5 psig at room temperature, and then mixing the $CO_2$-containing curing solution with the epoxy solution in pressure equipment while maintaining about 5 psig with $CO_2$. The resulting epoxy composition is then stored under pressure until applied for its intended purpose.

The $CO_2$-containing composition can be stored and transported, preferably under pressure, for a time which varies depending upon the components of the system and the $CO_2$ treatment received. For the representative $CO_2$-retarded Epon® 828 composition described above, the effective shelf life would be expected to be at least 1-7 days. The compositions, when used within the time of effective $CO_2$ cure retardation, are suitable for the same uses as untreated compositions. Upon application of the composition to a surface, the cure reaction proceeds and the resin sets to a coating or film.

The invention $CO_2$-treated epoxy composition is useful for any purpose for which conventional epoxy resin compositions are used. For example, the epoxy composition can be used for protecting oxidizable metal surfaces, particularly surfaces of objects made of iron and steel. It is useful for treating metal surfaces of equipment in oil, gas and geothermal wells which are subjected to high temperatures and pressures and corrosive chemical agents. It is also useful for treating pipelines in which water-containing fluids are transported.

Down-hole treatments with the epoxy compositions can be effected by a variety of methods known in the art depending upon the particular chemical and physical characteristics of the well being treated. In practice, a $CO_2$-treated corrosion-inhibiting epoxy composition can be maintained in storage tanks or drums for about a week or more prior to pumping the mixture downhole.

EXAMPLE I

Preparation of $CO_2$-Containing Solutions

A 25 g portion of a first curing agent solution containing equal weights of Duomeen® T methanol and xylene was charged to a 150 mL pressure bottle equipped with a magnetic stirrer and pressure gauge. For 30 minutes at ambient conditions, carbon dioxide gas was introduced into the stirred solution at 5 psig pressure. The weight of the system increased by 1.23 g due to absorption of carbon dioxide. This represents a molar ratio of $CO_2$ to amine of approximately 1:1. An epoxy resin solution was separately prepared by mixing Epon® 828 and xylene in an epoxy resin:xylene weight ratio of 3:1. One volume of the epoxy resin solution was then mixed with four volumes of the $CO_2$ treated amine solution. The resulting composition was stored under $CO_2$ pressure until used for the corrosion tests described below.

EXAMPLE II

Corrosion Inhibition Tests with $CO_2$-Containing Solutions

A series of laboratory corrosion inhibition tests was carried out in 1-liter Erlenmeyer flasks equipped with magnetic stirring bars, under laboratory conditions designed to simulate corrosive oil-water enviroments typical of field drilling sites. A charge of 50 mL of crude oil and 950 mL of synthetic brine was used in each run. A slow stream of carbon dioxide was bubbled through the solution during each test to maintain the mixture near saturation with $CO_2$ at ambient conditions. After 950 mL of synthetic North Sea water (93.1g $CaCl_2 \cdot 2H_2O$, 46.4 g $MgCl_2 \cdot 6H_2O$ and 781.1 g NaCl per 5 gal distilled $H_2O$) was charged into the Erlenmeyer flask, the $CO_2$-treated corrosion inhibitor system containing amine, epoxy resin, alcohol and hydrocarbon diluent was charged to the flask followed by addition of Teesside crude oil. A carbon steel probe was suspended in the stirred oil-water mixture maintained at about 49° C. during each run. The rate of corrosion and the pitting index were determined using a Corrator® monitoring system available from Rohrback instruments. Results are summarized in Table I.

TABLE I

| Run No. | Time Elapsed[a] Before Testing (Hrs) | $CO_2$ Treatment | Corrosion Rate mpy | Pitting Index |
|---|---|---|---|---|
| 1 | 0 | YES | 0.02 | 0.02 |
| 2 | 0 | NO | 0.04 | 0.0 |
| 3 | 1 | YES | 0.06 | 0.03 |
| 4 | 1 | NO | 0.10 | 1.03 |
| 4[a] | 1.5 | NO | 0.41 | 1.2 |
| 5 | 2 | YES | 0.02 | 0.02 |
| 6 | 2 | NO | 5.6 | 1.6 |
| 7 | 4 | YES | 0.07 | 0.0 |
| 8 | 4 | NO | 5.8 | 2.6 |
| 9 | 24 | YES | 0.02 | 0.01 |
| 10 | 24 | NO | 5.6 | 3.1 |
| 11 | 672 | YES | 2.8 | 0.8 |
| 12 | 672 | NO | 5.2 | 2.8 |

[a]The time elapsed before testing indicates the time in hours that the total compositions were stored on the shelf at ambient temperature before the corrosion test was run. The invention system was maintained under positive $CO_2$ pressure throughout the aging period of about 28 days.

Invention runs 1,3,5,7, and 9 demonstrate that the carbon dioxide pressured system containing epoxy resin, polyamine, methanol and xylene has longer shelf life than a similar unpressured system of control runs 2,4,4a,6, 8 and 10. Referring to invention run 5 and control run 6, it can be seen that use of the $CO_2$-pressured composition resulted in a lower corrosion rate (0.02 mpy) than did the unpressured control system (5.6 mpy). It is noteworthy that the invention composition of run 9, even after storage under $CO_2$ pressure for 24 hours, gave a low corrosion rate of 0.02 mpy compared with the much higher corrosion rate of 5.6 mpy of the 24-hour control run 10. A review of the pitting index values confirms the increased effectiveness of the system when stored under $CO_2$. The run at 672 hours shows the superiority of the $CO_2$-treated system over an extended period of time.

I claim:

1. A method for treating a metal surface to inhibit corrosion thereof, the method comprising applying to the surface a composition prepared by contacting constituents comprising an epoxy resin, a curing agent for the epoxy resin, a hydrocarbon diluent and carbon dioxide.

2. The method of claim 1 in which the carbon dioxide is present in the form of a gas under greater than atmospheric pressure.

3. The method of claim 1 in which the curing agent for the epoxy resin is a polyamine.

4. The method of claim 1 in which the composition further comprises an alkanol.

5. The method of claim 4 in which the hydrocarbon diluent is xylene.

6. The method of claim 5 in which the carbon dioxide is present in an amount effective to inhibit cure of the epoxy resin by the amine.

7. The method of claim 5 in which the molar ratio of the carbon dioxide to amine is within the range of about 100:1 to about 1:100.

8. The method of claim 5 in which the molar ratio of carbon dioxide to amine is within the range of about 10:1 to 1:10.

9. The method of claim 8 in which the amine is N-tallow-1,3-diaminopropane, the epoxy resin is a reaction product of epichlorohydrin and 2,2-bis(4-hydroxyphenyl)propane, and the hydrocarbon diluent is xylene.

10. A method for treating metal surfaces of downhole equipment in a well for the recovery of natural fluids from a subterranean reservoir, the method comprising injecting into the well a composition prepared by contacting constituents comprising an epoxy resin, a curing agent for the epoxy resin, a hydrocarbon diluent and carbon dioxide, and permitting the injected composition to contact the metal surfaces.

11. The method of claim 10 in which the composition further comprises an alkanol.

12. The method of claim 11 which comprises preparing the composition by mixing an amine solution comprising an amine curing agent, a hydrocarbon diluent, and carbon dioxide with an epoxy solution comprising an epoxy resin in a hydrocarbon diluent.

13. The method of claim 12 in which the thus-prepared composition is maintained under carbon dioxide pressure for at least 7 days prior to use in well treatment.

14. The method of claim 13 in which the molar ratio of carbon dioxide to polyamine is within the range of about 2:1 to about 1:2.

15. The method of claim 1 in which the composition is maintained under carbon dioxide pressure for a time of from one to seven days prior to treatment of the metal surfaces.

16. The method of claim 10 in which the molar ratio of carbon dioxide to polyamine is within the range of about 2:1 to about 1:2.

17. The method of claim 10 in which the composition is maintained under carbon dioxide pressure for a time of from one to seven days prior to treatment of the metal surfaces.

* * * * *